United States Patent [19]
Porret et al.

[11] 3,864,358
[45] Feb. 4, 1975

[54] EPOXY-ACRYLIC ACID ESTERS

[75] Inventors: Daniel Porret, Binningen; Jurgen Habermeier, Pfeffingen, both of Switzerland

[73] Assignee: Ciba-Geigy Corporation, Ardsley, N.Y.

[22] Filed: July 9, 1973

[21] Appl. No.: 377,699

[30] Foreign Application Priority Data
July 12, 1972  Switzerland.................. 10425/72

[52] U.S. Cl........... 260/309.5, 260/88.3 R, 260/260
[51] Int. Cl.............................................. C07d 49/32
[58] Field of Search................................. 260/309.5

[56] References Cited
UNITED STATES PATENTS
3,726,895   4/1973   Habermeier et al............ 260/309.5

*Primary Examiner*—Henry R. Jiles
*Assistant Examiner*—C. M. S. Jaisle

[57] ABSTRACT

New epoxy-acrylic acid esters are obtained if 3-(acryloyloxyalkyl)-hydantoins are glycidylated in a known manner.

The new epoxy-acrylic acid esters are viscous liquids with good processing properties. They furthermore possess a good solvent power for polymerisable monomers and can, without difficulties, be cast together with these.

6 Claims, No Drawings

EPOXY-ACRYLIC ACID ESTERS

The present invention relates to a new epoxy-acrylic acid esters, a process for their manufacture and the use of the new epoxy-acrylic acid esters for the manufacture of cured moulded materials and coatings.

Compounds which possess both a glycidyl group and an acrylate group in the molecule are a known class of compounds. Thus, for example, glycidyl acrylate and glycidyl methacrylate have already been proposed for the manufacture of crosslinked macromolecules.

Glycidyl acrylate is manufactured from glycidol by esterification with acrylic acid. Glycidol, like other epoxidealcohols, is a relatively expensive substance. Furthermore, the boiling points of glycidyl acrylate and glycidyl methacrylate (boiling point ~190°) lie in the region of the epoxide resin curing temperatures such as are normally employed when using hot curing agents, for example polycarboxylic acid anhydrides, so that special measures have to be taken in the case of this type of curing.

It has now been found that new epoxy-acrylates which show better processing properties are obtained in a simple and cheap manner by reaction of epihalogeno hydrins, for example epichlorohydrin, with certain acrylic acid esters obtained from monohydroxyalkyl-substituted N,N-heterocyclic compounds and acrylic acid and/or methacrylic acid. The new epoxyacrylates are viscous liquids with high boiling points, that is to say they cannot be distilled at temperatures up to above 250°C at normal pressure. Furthermore, the new epoxy-acrylates show a good solvent power for polymerisable monomers, such as styrene or acrylic acid esters so that they can, without difficulties, be cast together with such monomers.

Hence the subject of the present invention are new epoxy-acrylic acid esters of the formula

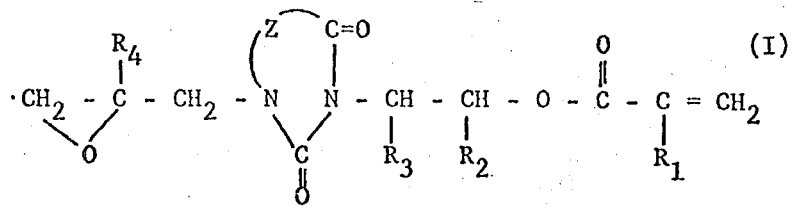

wherein Z represents a divalent radical of the formulae

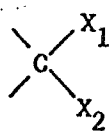  or  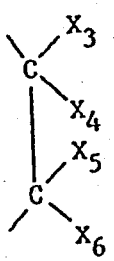

wherein $X_1$ and $X_2$ each denote a hydrogen atom, or an aliphatic, cycloaliphatic, araliphatic or aromatic hydrocarbon radical, or together denote the tetramethylene or pentamethylene radical, $X_3$ and $X_5$ each denote a hydrogen atom or an aliphatic cycloaliphatic, araliphatic or aromatic hydrocarbon radical, $X_4$ and $X_6$ each represent a hydrogen atom or an alkyl radical, and $R_1$, $R_3$ and $R_4$ independently of one another each represent a hydrogen atom or the methyl group, and $R_2$ represents a hydrogen atom, an alkyl group, an alkyl group interrupted by ether oxygen atoms or the phenyl group, or wherein $R_2$ and $R_3$ together denote the trimethylene or tetramethylene radical.

Preferably, in the Formula I, Z denotes the divalent radical of the formula

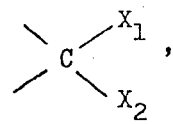

wherein $X_1$ and $X_2$ each represent a hydrogen atom or an alkyl radical with 1–4 carbon atoms or together represent the tetramethylene or pentamethylene radical. $R_1$ and $R_3$ independently of one another each denote a hydrogen atom or the methyl group and $R_2$ denotes a hydrogen atom or the methyl or phenyl group, or $R_2$ and $R_3$ together also denote the trimethylene or tetramethylene radical.

The new epoxy-acrylic acid esters of the Formula I can be manufactured according to known processes by reacting acrylic acid esters of the formula

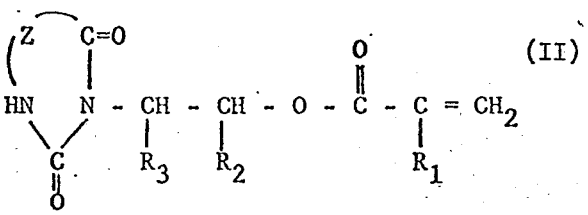

wherein Z, $R_1$, $R_2$ and $R_3$ have the same meaning as in the Formula I, in one step or several steps, with an epihalogenohydrin or β-methylepihalogenohydrin, such as, for example, epibromohydrin, in the presence of a catalyst.

In the case of the one-step process the reaction of epihalogenohydrin with a compound of the Formula II takes place in the presence of alkali, sodium hydroxide or potassium hydroxide being used preferably. In this one-step process, the epichlorohydrin reacting can be replaced wholly or partially by dichlorohydrin, which under the process conditions, and on appropriate addition of alkali, is transiently converted into epichlorohydrin and then reacts as such with the acrylic acid ester of the Formula II.

In the preferentially used two-stage process, the compound of the Formula II undergoes an addition reaction, in a first step, with an epihalogenohydrin in the presence of acid or basic catalysts, to give the halogenohydrin ether, and thereafter, in a second step, the latter is dehydrohalogenated by means of alkalis, such as potassium hydroxide or sodium hydroxide, to give the glycidyl ether.

Suitable acid catalysts in the two-stage process are particularly Lewis acids, such as, for example, $AlCl_3$, $SbCl_5$, $SnCl_4$, $FeCl_3$, $ZnCl_2$, $BF_3$ and their complexes with organic compounds.

The reaction can also be accelerated by addition of other suitable catalysts, for example alkali metal hydroxides, such as sodium hydroxide, or alkali metal halides, such as lithium chloride, potassium chloride and sodium chloride, sodium bromide and sodium fluoride.

The new epoxy-acrylic acid esters of the Formula I, according to the invention, are preferably manufactured by reacting an epihalogenohydrin, preferably epichlorohydrin, with a compound of the Formula II in the presence of a basic catalyst such as, preferably, a tertiary amine or a quaternary ammonium base or a quaternary ammonium salt, and treating the resulting product containing halogenohydrin groups with agents which split off hydrogen halide.

Preferably, the manufacture of the epoxy-acrylic acid esters of the Formula I starts from acrylic acid esters of the Formula II in which Z denotes the divalent radical of the formula

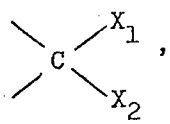

wherein $X_1$ and $X_2$ each denote a hydrogen atom or an alkyl radical with 1–4 carbon atoms or together denote the tetramethylene or pentamethylene radical, $R_1$ and $R_3$ independently of one another each represent a hydrogen atom or the methyl group and $R_2$ denotes a hydrogen atom, the methyl group or the phenyl group, or wherein $R_2$ and $R_3$ together denote the trimethylene or tetramethylene radical.

Suitable catalysts for the addition of epihalogenhydrin are above all: tertiary amines such as triethylamine, tri-n-propylamine, benzyldimethylamine, N,N'-dimethylaniline and triethanolamine; quaternary ammonium bases such as benzyltrimethylammonium hydroxide; quaternary ammonium salts, such as tetramethylammonium chloride, tetraethylammonium chloride, benzyltrimethylammonium chloride, benzyltrimethylammonium acetate and methyltriethylammonium chloride; also, ion exchange resins with tertiary or quaternary amino groups; further, trialkylhydrazonium salts, such as trimethylhydrazonium iodide.

Further suitable catalysts are also low molecular thioethers and sulphonium salts, or compounds which can be converted with the epihalogenhydrins into thioethers or sulphonium compounds, such as hydrogen sulphide, sodium sulphide or mercaptans.

As such thioethers or sulphonium salts there may be mentioned: diethyl-sulphide, β-hydroxyethyl-ethyl-sulphide, β-hydroxypropyl-ethyl-sulphide, ω-hydroxytetramethylene-ethylsulphide, thiodiglycol, mono-β-cyanoethyl-thioglycol-ether, dibenzyl-sulphide, benzyl-ethyl-sulphide, benzyl-butyl-sulphide, trimethylsulphonium iodide, tris(β-hydroxyethyl)sulphonium chloride, dibenzylmethylsulphonium bromide, 2,3-epoxypropylmethylethylsulphonium iodide, dodecylmethyl-sulphide and dithiane.

As a rule, strong alkalis, such as anhydrous sodium hydroxide or aqueous sodium hydroxide solution, are used for the dehydrohalogenation, but it is also possible to use other alkaline reagents, such as potassium hydroxide, barium hydroxide, calcium hydroxide, sodium carbonate or potassium carbonate.

The dehydrohalogenation, in turn, can be carried out in several steps. Thus it is possible first to carry out a treatment with solid sodium hydroxide or potassium hydroxide at elevated temperature and, after distilling off the excess epihalogenohydrin, to heat the residue in an inert solvent with a less than equivalent amount of concentrated alkali metal hydroxide solution, for example 50% strength sodium hydroxide solution.

Possible epihalogenohydrins are epibromohydrin, β-methylepichlorohydrin and above all epichlorohydrin.

Good yields are obtained if an excess of epihalogenohydrin, and in particular preferably 4 to 40 mols of epihalogenohydrin per NH group, is used.

The acrylic acid esters of the Formula II are obtained in a known manner by esterifying monohydroxy compounds of the formula

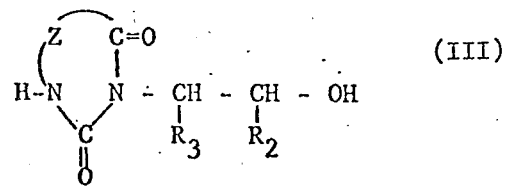

wherein Z, $R_2$ and $R_3$ have the same meaning as in the Formula I, with acrylic and/or methacrylic acid in a manner which is in itself known or trans-esterifying such compounds with acrylic acid esters and/or methacrylic acid esters in a manner which is in itself known.

In the case of the direct esterification of the monohydroxy compound of the Formula III with acrylic acid and/or methacrylic acid, reactants can be present either in approximately stoichiometric amounts or in a stoichiometric excess with regard to the acrylic acid and/or methacrylic acid. The esterification reaction is advantageously carried out with the use of an agent for forming an azeotrope. The reaction is as a rule acid-catalysed and carried out in the temperature range of 35°–200°C, preferably 60°–150°C. For working up, the reaction solutions are washed until free of acid, concentrated, provided with stabilisers if appropriate and then dried to constant weight in vacuo.

In the trans-esterification of the monohydroxy compounds of the Formula III with acrylic acid esters and/or methacrylic acid esters, acrylic acid esters or methacrylic acid esters of lower aliphatic alcohols are preferably used, and preferably in a stoichiometric excess. The trans-esterification reactions are also acid-catalysed and carried out in the abovementioned temperature range. The lower aliphatic alcohol produced in this reaction is continuously distilled from the batch. The excess monoacrylic acid ester or monomethacrylic acid ester is also removed from the reaction mixture by distillation. The crude product is then dissolved in an organic inert solvent, for example benzene, and worked up analogously to the reaction solutions obtained by esterification.

The monohydroxy compounds of the Formula III are known compounds and can be manufactured according to the process described in U.S. Pat. No. 3,629,263, by adding onto 1 mol of a N-heterocyclic compound of the formula

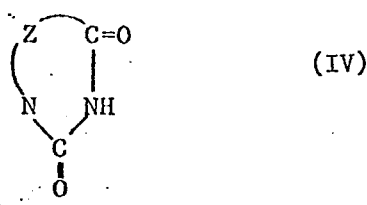

wherein Z has the same meaning as in the Formula I, 1 mol of a monoepoxide of the formula

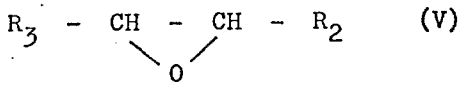

wherein $R_2$ and $R_3$ have the same meaning as in the Formula I, in the presence of a suitable catalyst.

As suitable representatives of monoepoxides of the Formula V there may be mentioned: ethene oxide, propene oxide, n-butene oxide, 1,2-cyclopentene oxide or 1,2-cyclohexene oxide, styrene oxide and glycidyl alkyl ethers, such as butyl-, amyl-, octyl- or dodecenyl-glycid.

A preferred class of compounds of N-heterocyclic monohydroxy compounds which are employed as starting substances corresponds to the formula

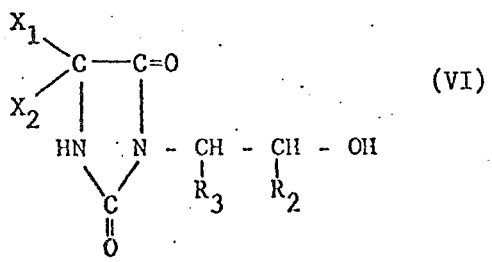

wherein $X_1$, $X_2$, $R_2$ and $R_3$ have the same meaning as in the Formula I. As examples of compounds of the Formula VI there may be mentioned: 3-(2'-hydroxyethyl)-5,5-dimethylhydantoin, 3-(2'-hydroxy-n-propyl)-5,5-dimethylhydantoin, 3-(2'-hydroxy-n-butyl)-5,5-dimethylhydantoin, 3-(2'-hydroxy-2'-phenylethyl)-5,5-dimethylhydantoin, 3-(2'-hydroxy-n-propyl)-5,5-pentamethylenehydantoin, 3-(2'-hydroxyethyl)-5,5-tetramethylenehydantoin, 3-(2'-hydroxycyclohexyl)-5,5-dimethylhydantoin and 3-(2'-hydroxyethyl)-5-isopropylhydantoin.

The further class of compounds of N-heterocylic monohydroxy compounds which are employed as starting substances corresponds to the formula

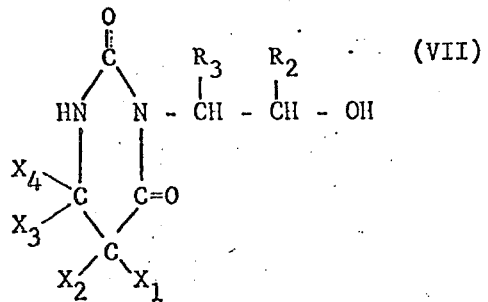

wherein $X_1$, $X_2$, $X_3$, $X_4$, $R_2$ and $R_3$ have the same meaning as in the Formula I. As individual compounds there may be mentioned: 3-(2'-hydroxyethyl)-5,5-dimethyl-6-isopropyl-5,6-dihydrouracil, 3-(2'-hydroxy-n-propyl)-5,5-dimethyl-6-isopropyl-5,6-dihydrouracil and 3-(2'-hydroxy-2'-phenyl)-5,5-dimethyl-6-isopropyl-5,5-dihydrouracil.

The new epoxy-acrylic acid esters according to the invention, of the Formula I, react both with the customary curing agents for epoxide compounds and with the customary polymerisation catalysts and can be converted, with the aid of these curing agents, into crosslinked, cured products, in particular, as a rule, with simultaneous shaping to give moulded articles, such as castings, pressings or laminates, or to give coatings, coverings or adhesive bonds.

The new epoxy-acrylic acid esters are interesting compounds in as much as they possess two reactive groups which are different from one another and which can be converted into crosslinked, cured products both simultaneeously in one curing stage and also successively in a two-stage curing reaction, using appropriate curing agents and/or curing catalysts.

In the one-stage curing reaction, the curing agents and/or curing catalysts required for the reaction of the reactive groups are added simultaneously. In the case that anionic, but especially cationic, curing catalysts are used, further curing agents are superfluous.

For many applications, two-stage curing is of particular interest, since the products obtained by reaction of one of the reactive groups can, if appropriate after application, be post-cured. In this way it is furthermore possible to a certain extent to control the final properties of the cured moulded material.

Thus it is possible one the one hand, for example, to manufacture from the new epoxy-acrylic acid esters, by customary polymerisation, polymers which possess lateral glycidyl groups and which can advantageously be used as polyepoxides, especially for compression moulding compositions or in surface protection. On the other hand it is also possible first to react the epoxide group in the new epoxy-acrylic acid esters and completely to cure the partially cured, optionally applied, resin by radiation curing, for example with the aid of ionising rays.

Possible epoxide resin curing agents are acids, basic and catalytic curing agents. As suitable curing agents there may mentioned: amines or amides, such as aliphatic, cycloaliphatic or aromatic, primary, secondary and tertiary amines, for example ethylenediamine, hexamethylenediamine, trimethylhexamethylenediamine, diethylenetriamine, triethylenetetramine, N,N-dimethylpropylenediamine-1,3, N,N-diethylpropylenediamine-1,3, bis-(4-amino-3-methylcyclohexyl)-methane, 3,5,5-trimethyl-3-(aminomethyl)-cyclohexylamine ("Isophoronediamine"), Mannich bases, such as 2,4,6-tris-(dimethylaminomethyl)-phenol; p-phenylenediamine, bis-(4-aminophenyl)-methane, bis-(4-aminophenyl)-sulphone, N-(2-aminoethyl)-piperazine; polyamides, especially those from aliphatic polyamines, such as di-, ethylenetriamine or triethylenetetramine and dimerised or trimerised unsaturated fatty acids, such as dimerised linseed oil fatty acid (VERSAMID); polymeric polysulphides (THIOKOL); dicyandiamide and anilineformaldehyde resins; polyhydric phenols, for example resorcinol, 2,2-bis-(4-hydroxyphenyl)-propane or phenol-formaldehyde resins; boron trifluoride and its complexes with organic compounds such as $BF_3$-ether complexes and $BF_3$-amine complexes, for example $BF_3$-monoethylamine complex; acetoacetanilide-$BF_3$ complex; phosphoric acid; triphenylphosphite; polybasic carboxylic acids and their anhydrides, for example phthalic anhydride, Δ⁴-tetrahydrophthalic anhydride, hexahydrophthalic anhydride, 4-methylhexahydrophthalic anhydride, 3,6-endomethylene-Δ⁴-tetrahydrophthalic anhydride, methyl-3,6-endomethylene-Δ⁴-tetrahydrophthalic anhydride (= methylnadic anhydride), 3,4,5,6,7,7-hexachloro-3,6-endomethylene-Δ⁴-tetrahydrophthalic anhydride, succinic anhydride, adipic anhydride, azelaic anhydride, sebacic anhydride, maleic anhydride and dodecenylsuccinic anhydride; pyromellitic dianhydride or mixtures of such anhydrides.

Curing accelerators can furthermore by employed in the curing reaction; when using polyamides, dicyandiamide, polymeric polysulphides or polycarboxylic acid anhydrides as curing agents, suitable accelerators are, for example, tertiary amines, their salts or quaternary ammonium compounds, for example 2,4,6-tris-(dimethylaminomethyl)-phenol, benzyldimethylamine, 2-ethyl-4-methyl-imidazole, 4-amino-pyridine, triamylammoinium phenolate; and also alkali metal alcoholates, such as, for example, sodium hexanetriolate. When curing with amines, accelerators which can be employed are, for example, monophenols or polyphenols, such as phenol or diomethane, salicylic acid or thiocyanates.

For the polymerisation or copolymerisation, the customary free radical-forming catalysts are preferably employed; there may be mentioned hydrazine derivatives, for example hydrazine hydrochloride, organometallic compounds, such as lead tetraethyl, and also, in particular, aliphatic azo compounds, such as α,α'-azoisobutyrodinitrile and organic peroxides or per-salts, such as, for example peracetic acid, acetyl peroxide, chloroacetyl peroxide, trichloroacetyl peroxide, benzoyl peroxide, chlorobenzoyl peroxide, benzoylacetyl peroxide, propionyl peroxide, fluorochloropropionyl peroxide, lauroyl peroxide, cumene hydroperoxide, cyclohexanone hydroperoxide, tert.-butyl hydroperoxide, di-tert.-butyl peroxide, di-tert.-amyl peroxide and p-methane hydroperoxide; further, inorganic peroxide compounds, such as sodium peroxide, alkali metal persulphates or alkali metal perborates, and especially hydrogen peroxide, which can advantageously replace the expensive benzoyl peroxide. The amount added depends, in a known manner, on the desired course of the reaction or the desired properties of the polymer; advantageously, about 0.05 to 10 per cent by weight of the catalyst, relative to the total weight of the polyacrylate or polyacrylate-monomer mixture, are employed, either adding the total amount of the catalyst at the beginning of the polymerisation or adding it in portions over the course of the polymerisation.

In certain cases it is also possible to use cationic or anionic catalysts, by means of which the epoxide group can also be caused to react.

The epoxy-acrylic acid esters according to the invention can be cured and/or polymerised or, where relevant, copolymerised, by themselves or mixed with other epoxide resins and preferably with other polymerisable monomers, whilst being moulded or in the form of sheet-like structures. The new epoxy-acrylic acid esters show very good compatibility and miscibility with other polymerisable monomers and in quantitative terms a relatively large amount of these monomers can be used without great deterioration of the mechanical properties of the mouldings manufactured therefrom.

Possible monomers which can be added to the new epoxy-acrylic acid esters of the Formula I are both compounds of the acrylic acid series, such as esters of acrylic acid or methacrylic acid and alcohols or phenols, for example methyl acrylate, butyl acrylate, methyl methacrylate, acrylonitrile, methacrylonitrile, ethylene glycol dimethacrylate, and other reactive olefinically unsaturated monomers, such as, for example, styrene, divinylbenzene or vinyl acetate.

Hence, a further subject of the present invention are curable mixtures which are suitable for the manufacture of moulded articles, including sheet-like structures, and which contain the epoxy-acrylic acid esters according to the invention, optionally together with other epoxide compounds and polymerisable monomers, and also curing agents for epoxide resins and/or curing catalysts for the polymerisation reaction.

The epoxy-acrylates according to the invention or their curable mixtures can furthermore be mixed, in any stage before curing, with customary modifiers, such as extenders, fillers and reinforcing agents, pigments, dyestuffs, organic solvents or plasticisers, flow control agents, agents for conferring thixotropy, flameproofing substances or mould release agents.

The curable epoxy-acrylate resin mixtures according to the invention are above all employed in the fields of surface protection, the electrical industry, laminating processes and the building industry. They can be used, in a formulation suited in each case to the particular application, in the unfilled or filled state, and optionally in the form of solutions or emulsions, as paints, lacquers, compression moulding compositions, sintering powders, dipping resins, casting resins, injection moulding formulations, impregnating resins and binders, adhesives, tool resins, laminating resins, sealing and surface-filling compositions, flooring covering compositions and binders for mineral aggregates.

In the examples which follow, unless otherwise stated, parts denote parts by weight and percentages denote percentages by weight.

MANUFACTURE OF THE STARTING COMPOUNDS

Example A

A mixture of 1,033.2 g of 3-(2'-hydroxyethyl)-5,5-dimethylhydantoin (6 mols), 775 g of methacrylic acid (9 mols, corresponding to a 50% excess of methacrylic acid), 3 litres of toluene, 20 ml of 50% strength sulphuric acid, 0.45 g of phenothiazine and 3 g of triphenylphosphite, in a stirred flask of 6 litres capacity, provided with a thermometer, stirrer, dropping funnel, water separator with reflux condenser and receiver, is brought to 103°C internal temperature whilst stirring, at 160°C bath temperature. In the course thereof, a vigorous circulatory distillation commences and the progress of the reaction can be ascertained from the amount of water separated out in the water separator. After 1 hour, a further 20 ml of 50% strength sulphuric acid are added by means of a dropping funnel. The internal temperature now rises to 113°C in the course of the reaction. After a total of 13 hours, 120 ml of water are present in the receiver (Theory: 128 ml) and the reaction is terminated by cooling to room temperature.

To isolate the desired methacrylate, the resulting reaction mixture is twice extracted by shaking with 500 ml of an aqueous solution which contains 10% of ammonia and 5% of ammonium sulphate.

The following stabiliser mixture is then added to the organic phase: 0.5 g of hydroquinone, 0.14 g of pyrocatechol, 0.04 g of copper naphthenate (8% strength) and 0.05 g of NaNO₂ in 0.15 g of H₂O.

The organic phase is now completely concentrated at 55°C/15 mm Hg and dried to constant weight. 1,123.2 g of a beige-coloured crystalline material is obtained (84% of theory).

For purification the new methacrylate can be recrystallised, for example from a tetrahydrofurane/hexane (1:1) solvent mixture or from cyclohexane. A 200 g sample recrystallised from cyclohexane gives 138 g of colourless crystals (without working-up the motherliquor), melting at 80.9°C (Mettler "FP 51"; speed of heating: 1°C/minute).

Elementary analysis gives the following values:

| Found: | Calculated: |
| --- | --- |
| 54.93 % C | 54.99 % C |
| 6.76 % H | 6.71 % H |
| 11.68 % N | 11.66 % N |

Both micro-hydrogenation and titrimetric determination of the double bond show that the calculated amount of methacrylate groups is present. The infrared spectrum, like the proton-magnetic resonance spectrum, agree with the following structure:

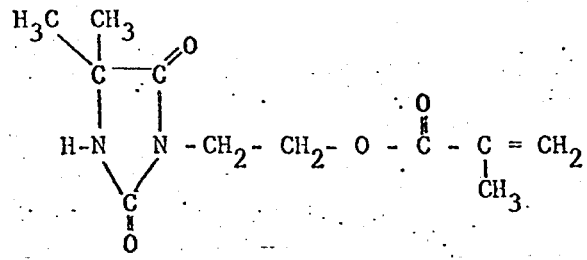

Example B

The following mixture is brought to 82°C (bath temperature 150°C) whilst stirring, in an apparatus similar to that described in Example A: 172.2 g of 3-(2'-hydroxyethyl)-5,5-dimethylhydantoin (1 mol), 108.2 g of acrylic acid (1.5 mols), 600 ml of benzene, 12 g of p-toluenesulphonic acid, 40 g of acid ion exchanger I (commercially available under this name from Messrs. Merck), 0.08 g of phenothiazine and 0.5 g of triphenylphosphite.

As soon as the mixture has reached the abovementioned temperature, the removal of water from the system starts immediately. The reaction is complete after about 30 hours. The mixture is cooled to 25°C and filtered, and the working up, isolation and stabilisation are then carried out according to Example A.

133 g (59% of theory) of a light yellow crystalline mass are obtained, in which the content of acrylate groups, according to titration, is 95% of theory, whilst microhydrogenation indicates a 100% acrylate content.

Elementary analysis shows:

| Found: | Calculated: |
| --- | --- |
| 12.30 % N | 12.38 % N |
| 6.30% H | 6.24% H |

The infra-red spectrum and the proton-magnetic resonance spectrum agree with the following structure:

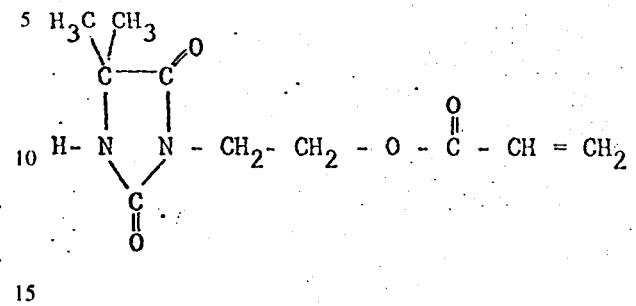

Example C 186.2 g of 3-(2'-hydroxypropyl)-5,5-dimethylhydantoin (1 mol) are reacted analogously to Example B in the manner described, with 108.2 g of acrylic acid (1.5 mols) in 600 ml of benzene under the catalytic action of 22 g of p-toluene sulphonic acid and 50 g of acid ion exchanger I from Messrs. Merck, together 0.08 g of phenothiazine and 0.5 g of triphenylphosphite as inhibitors. The reaction is carried out, and the mixture is worked up, exactly as described in Example 2. 195 g of a clear, light yellow, viscous liquid which crystallises completely after a few hours are obtained. The content of acrylate groups according to titration is 97.6% of theory; micro-hydrogenation gives a value of 100% of theory, and the proton-magnetic resonance spectrum indicates a purity of about 97% of theory. For purification, a sample is recyrstallised from a tetrahydrofurane/hexane (1:1) solvent mixture in the ratio of 1:1. A colourless crystal powder is obtained, which melts at 91.2°C (Mettler "FP 51", using a speed of heating of 1°C/minute), and in which the content of acrylate groups is determined by titration to be 4.08 equivalents/kg (corresponding to 98.3% of theory). The new acrylate corresponds to the following formula:

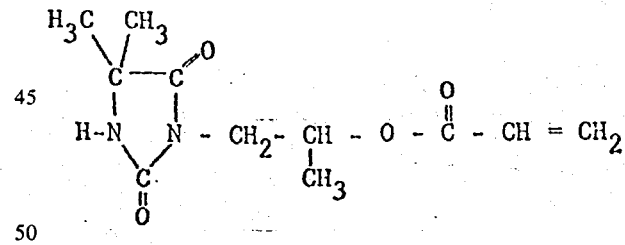

Example D

The acrylic acid ester from 3-(2'-hydroxy-2'-phenylethyl)-5,5-pentamethylenehydantoin is manufactured analogously to Example A by reaction of the following reaction mixture: 153 g of 3-(2'-hydroxy-2'-phenylethyl)-5,5-pentamethylenehydantoin (0.53 mol), 57.3 g of acrylic acid (0.795 mol), 350 ml of toluene, 1.8 ml of H₂SO₄ (50% strength), 0.035 g of phenothiazine and 0.265 g of triphenylphosphite.

Working up according to Example A yields 176.3 g of a brown, highly viscous crude product, wherein the content of acrylate groups is 63.87% of theory.

Example E

Analogously to Example A, the acrylic acid ester of 3-(2'-hydroxy-2'-phenylethyl)-5-isopropyl-hydantoin is obtained by reaction of the following reaction mixture: 393.5 g of 3-(2'-hydroxy-2'-phenylethyl)-5-isopropyl-hydantoin (1.5 mols), 162.14 g of acrylic acid (2.25 mols), 1,000 ml of toluene, 5 ml of $H_2SO_4$ (50% strength), 0.1 g of phenothiazine and 0.75 g of triphenylphosphite.

The reaction product is worked up and stabilised analogously to Example A. 396.5 g of a brown highly

| Found: | Calculated: |
|---|---|
| 6.80% H | 6.80% H |
| 9.30% N | 9.45% N |
| 0.4–0.5% total chlorine | 0% total chlorine |

The proton-magnetic resonance spectrum is in agreement with the following structure:

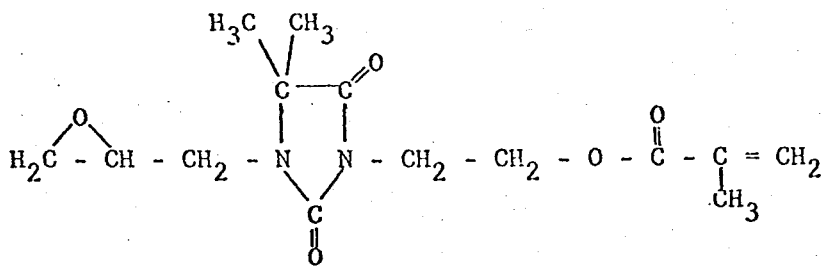

viscous crude product (83.6% of theory) are obtained, wherein the content of acrylate groups is 58.2% of theory.

EXAMPLES

Example 1

A mixture of 113 g (0.47 mol) of 3-(methacryloyloxyethyl)-5,5-dimethylhydantoin obtained according to Example A, 725 g (7.83 mols) of epichlorohydrin, 1.6 g of tetramethylammonium chloride (anhydrous), 0.15 g of thiodiphenylamine and 0.5 g of di-tert.-butyl-hydroquinone is stirred for 30 minutes at 80°C. Thereafter, a vacuum is applied at 145°–150°C bath temperature and is so adjusted (60–90 mm Hg) that a vigorous azeotropic circulatory distillation results at 60°C internal temperature. 41.4 g of 50% strength aqueous sodium hydroxide solution are then continuously added dropwise over the course of 2.5 hours, whilst stirring vigorously. At the same time, the water present in the reaction mixture is continuously distilled azeotropically from the batch, and separated off. After the addition of sodium hydroxide solution, the mixture is distilled for a further 30 minutes, under reflux of the epichlorohydrin, in order to remove all the water. It is cooled to 50°C and the sodium chloride produced is removed by suction filtration. The last remnants of sodium chloride and of alkali are removed by washing with 100 ml of water. The organic phase is separated off, 0.2 g of di-tert.-butyl-hydroquinone is added and the solution is concentrated and subsequently dried to constant weight at 55°C under 0.2 mm Hg.

130 g (93.6% of theory) of a clear, light yellow resin of low viscosity, which contains 3.4 epoxide equivalents/kg (100% of theory) and 3.1 methacrylate equivalents/kg (91.0% of theory) are obtained. Elementary analysis gives the following values:

Example 2

Analogously to Example 1, a mixture of 128.2 g (0.561 mol) of 3-(acryloyloxyethyl)-5,5-dimethylhydantoin obtained according to Example B is reacted with 1,893 g (0.561 mol) of epichlorohydrin, using 3.4 g of tetramethylammonium chloride. The dehydrochlorination is also carried out analogously to Example 1, with 49.5 g of 50% strength aqueous sodium hydroxide solution. The working up takes place analogously to Example 1.

148 g of a viscous, clear, brown resin (75% of theory) are obtained, containing 3.22 epoxide equivalents/kg (91.5% of theory) and 2.15 acrylic acid equivalents/kg (61% of theory); the total chlorine content is 0.9%. The new substance essentially corresponds to the following structure:

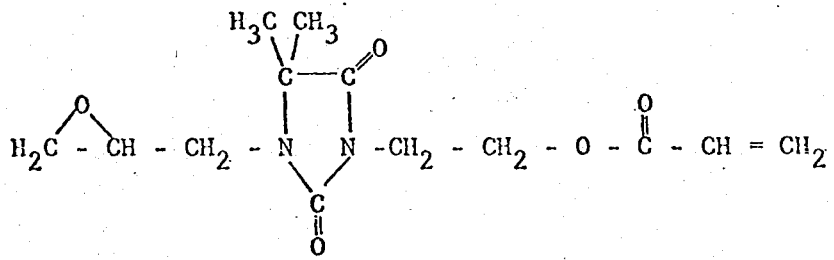

Example 3

Analogously to Example 1, 180 g (0.75 mol) of 3-(acryloyloxyisopropyl)-5,5-dimethylhydantoin manufactured according to Example C are mixed with 1,042 g (11.25 mols) of epichlorohydrin, 2.5 g of tetramethylammonium chloride, 0.2 g of phenothiazine and 0.7 g of di-tert.-butyl-hydroquinone and caused to react. The dehydrohalogenation according to Example 1 is carried out with 66 g of 50% strength aqueous sodium hydroxide solution (0.825 mol). After working up analogously to Example 1, 200 g of an ochre-coloured, viscous resin (90% of theory) are obtained, containing 3.06 epoxide equivalents/kg (90.7% of theory), 2.7 acrylic acid equivalents/kg (80% of theory) and 1.1% of total chlorine.

The elementary analysis gives the following values:

| Found: | Calculated: |
|---|---|
| 9.5% N | 9.45% N |
| 6.9% H | 6.80% H |
| 0.9% total chlorine | 0.0% chlorine |

The new substance essentially corresponds to the following structure:

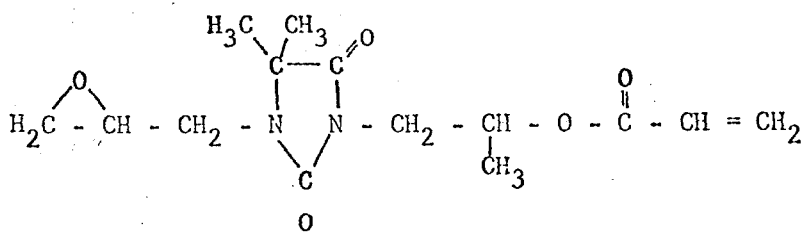

Example 4

Analogously to Example 1, 137 g (0.4 mol) of 3-(acryloyloxy-2'-phenylethyl)-5,5-pentamethylenehydantoin obtained according to Example D, 555 g of epichlorohydrin (6.0 mols), 1.5 g of tetramethylammonium chloride, 0.5 g of hydroquinone and 0.15 g of phenothiazine are reacted and subsequently the product is dehydrohalogenated with 36.8 g of 50% strength aqueous sodium hydroxide solution (0.46 mol).

Working up takes place analogously to Example 1 and 110 g of a brown, highly viscous resin having an epoxide content of 2.40 epoxide equivalents/kg are obtained.

Example 5

158.2 g (0.5 mol) of 3-(acryloyloxy-2'-phenylethyl)-5-isopropylhydantoin obtained according to Example E, 462.4 g of epichlorohydrin (5.0 mols), 1 g of tetramethylammonium chloride, 0.15 g of phenothiazine and 0.5 g of hydroguinone are stirred for 95 minutes at 90°C internal temperature. Thereafter, a procedure analogous to Example 1 is followed and 44 g of 50% strength aqueous sodium hydroxide solution are added dropwise at 60°C over the course of 120 minutes. The further working up takes place analogously to Example 1. This yields 135.3 g of a brown, highly viscous resin having an epoxide content of 2.65 epoxide equivalents/kg.

EXAMPLES OF APPLICATIONS

Example I

A mixture of 17.4 g of 1-glycidyl-3-(methacryloyloxyethyl)-5,5-dimethylhydantoin manufactured according to Example 1, with 3.4 epoxide equivalents/kg and 3.1 methacrylic equivalents/kg, 8.6 g of hexahydrophthalic anhydride and 13.6 g of methacrylic acid ethyl ester is stirred at 60°C to give a clear liquid. 0.3 g of benzoyl peroxide is added and this mixture is poured into an aluminium mould of 4 mm wall thickness which has been pre-warmed to 80°C. The curing and polymerisation takes place in 1½ hours at 80°C, 2 hours at 120°C and 10 hours at 140°C. A clear, transparent shaped article having the following mechanical properties is obtained:

| | | | |
|---|---|---|---|
| Flexural strength | (VSM* 77,103) | = | 14.5 kp/mm² |
| Deflection | (VSM 77,103) | = | 5.6 mm |
| Impact strength | (VSM 77,105) | = | 10.1 cm.kp/cm² |

*VSM = Normen des Vereins Schweizerischer Maschinenindustrieller (Standard Specifications of the Association of Swiss Engineering Companies).

Example II

Analogously to Example I, 20.3 g of 1-glycidyl-3-methacryloyloxyethyl-5,5-dimethylhydantoin manufactured according to Example 1 are reacted with 10.1 g of hexahydrophthalic anhydride, 14.4 g of styrene and 0.3 g of benzoyl peroxide. The reaction is carried out, and the product cured, analogously to Example I. Shaped articles having the following properties are obtained:

| | | |
|---|---|---|
| Flexural strength | (VSM 77,103) | = 14.83 kp/mm² |
| Deflection | (VSM 77,103) | = 6.0–7.2 mm |
| Impact strength | (VSM 77,105) | = 15.00–17.75 cm.kp/cm² |
| Water absorption | (4 days/20°C) | = 0.48%. |

Example III 62 g of 1-glycidyl-3-(acryloyloxyethyl)-5,5-dimethylhydantoin manufactured according to Example 2, with 3.22 epoxide equivalents/kg and 2.15 acrylic acid equivalents/kg, 29.4 g of hexahydrophthalic anhydride, 91.2 g of methacrylic acid ethyl ester and 0.8 g of benzoyl peroxide are mixed at 60°C and poured into aluminium moulds pre-warmed to 80°C. Curing takes place over the course of 1.5 hours at 80°C, 1.5 hours at 120°C and 12 hours at 140°C. Clear, transparent shaped articles having the following properties are obtained:

| | | |
|---|---|---|
| Flexural strength | (VSM 77,103) | = 11–12 kp/mm² |
| Deflection | (VSM 77,103) | = 8–12 mm |
| Impact strength | (VSM 77,105) | = 14–15 cm.kp/cm² |
| Heat distortion point | (ISO/R** 75) | = 84–85°C |
| Water absorption | (4 days/20°C) | = 0.9% |

** ISO/R = International Standards Organisation/Recommendation.

Example IV 100 g of 1-glycidyl-3-(2'-acryloyloxy-2'-phenylethyl)-5-isopropylhydantoin manufactured according to Example 5, 40.8 g of hexahydrophthalic anhydride, 30 g of acrylic acid ethyl ester and 750 mg of benzoyl peroxide (98% strength) are stirred at 60°C to give a clear liquid. The mixture was cured over the course of 1½ hours at 80°C, 2 hours at 120°C and 10 hours at 140°C. This gives a light brown, hard shaped article which is insoluble in acetone, chloroform and dimethylformamide.

What is claimed is:

1. Epoxyacrylic acid esters of the formula

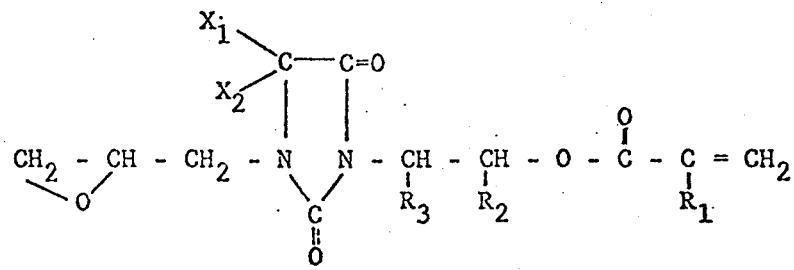

wherein $X_1$ and $X_2$ each represent a hydrogen atom or an alkyl radical with 1-4 carbon atoms or together represent the tetramethylene or pentamethylene radical, $R_1$ and $R_3$ independently of one another each represent a hydrogen atom or the methyl group and $R_2$ represents a hydrogen atom, the methyl or phenyl group, or where $R_2$ and $R_3$ together represent the trimethylene or tetramethylene radical.

2. A compound as claimed in claim 1, which is 1-glycidyl-3-(methacryloyloxyethyl)-5,5-dimethylhydantoin.

3. A compound as claimed in claim 1, which is 1-glycidyl-3-(acryloyloxyethyl)-5,5-dimethylhydantoin.

4. A compound as claimed in claim 1, which is 1-glycidyl-3-(acryloyloxyisopropyl)-5,5-dimethylhydantoin.

5. A compound as claimed in claim 1, which is 1-glycidyl-3-(acryloyloxy-2'-phenylethyl)-5,5-pentamethylenehydantoin.

6. A compound as claimed in claim 1, which is 1-glycidyl-3-(acryloyloxy-2'-phenylethyl)-5-isopropylhydantoin.

* * * * *